United States Patent [19]

Bardas

[11] Patent Number: 5,152,536
[45] Date of Patent: Oct. 6, 1992

[54] FLUID SEAL WITH A MAINTAINED GAP OF SEAL FACES

[76] Inventor: Theodor Bardas, 1808 Braemar Pl., S.W., Calgary, AB, Canada

[21] Appl. No.: 685,683

[22] Filed: Apr. 16, 1991

[51] Int. Cl.⁵ .............................................. F16J 15/34
[52] U.S. Cl. .................................... 277/1; 277/2; 277/74; 277/81 R; 277/93 R
[58] Field of Search ...................... 277/1, 2, 3, 28, 74, 277/81 R, 93 R, 93 SD, 57, 96.1

[56] References Cited

U.S. PATENT DOCUMENTS

| | | | |
|---|---|---|---|
| 1,806,515 | 5/1931 | Zoelly | 277/57 X |
| 3,070,410 | 12/1962 | Derks | 277/28 X |
| 3,159,969 | 12/1964 | Ernst et al. | 277/57 X |
| 3,580,587 | 5/1971 | Born | 277/28 X |
| 3,632,117 | 1/1972 | Villasor | 277/28 X |
| 3,679,217 | 7/1972 | Lesiecki | 277/28 X |
| 3,804,424 | 4/1974 | Gardner | 277/96.1 X |
| 4,434,987 | 3/1984 | Albers et al. | 277/28 X |
| 4,447,063 | 5/1984 | Kotzur et al. | 277/28 X |
| 4,497,493 | 2/1985 | Sall et al. | 277/2 |
| 4,643,437 | 2/1987 | Salaat et al. | 277/28 |
| 4,691,276 | 9/1987 | Miller et al. | 277/28 X |
| 4,722,534 | 2/1988 | Wentworth | 277/28 |
| 5,011,166 | 4/1991 | Watts | 277/93 SD X |
| 5,064,205 | 11/1991 | Whitford | 277/2 X |

FOREIGN PATENT DOCUMENTS

| | | | |
|---|---|---|---|
| 5159 | 1/1979 | Japan | 277/2 |
| 821827 | 4/1981 | U.S.S.R. | 277/2 |

Primary Examiner—William A. Cuchlinski, Jr.
Assistant Examiner—Scott W. Cummings
Attorney, Agent, or Firm—Anthony R. Lambert

[57] ABSTRACT

A device for a wear free sealing of fluids from within to the outside of the confined space of a rotating machine. The sealing effect occurs between coplanar faces of a rotating ring and a power assisted stationary ring which maintains a suitable distance among them.

19 Claims, 2 Drawing Sheets

FLUID SEAL WITH A MAINTAINED GAP OF SEAL FACES

FIELD OF THE INVENTION

The present invention relates to "dry" fluid seals for rotating equipment.

BACKGROUND AND SUMMARY OF THE INVENTION

Similar known devices maintain the gap between the sealing faces of the stationary and rotating ring by means of hydrodynamic forces which are produced by the friction of the fluid film against the surfaces of the ring geometry.

The rotating ring of the conventional dry seal is fabricated from a hard ceramic material with spiral grooves etched into its sealing surface. The stationary ring of such device is fabricated either from a soft carbon or a hard ceramic material with a smooth sealing surface. Geometrically the adjoining surfaces of the rings are shaped conically.

When motionless, the stationary ring is pressed against the rotating ring by the tension of springs. The full contact of both sealing faces minimizes the fluid leakage. While in motion, the grooves on the surface of the rotating ring perform a sweeping action against the fluid film. By virtue of the fluid viscosity the pumping action of the grooves builds up a pressure with a resulting force counteracting the spring tension. An equilibrium of force is accomplished with a tight spacing between the sealing faces.

The "lift off" of the stationary ring should under normal operating conditions occur at low rotational speeds. However, due to pressure or temperature deformation of sealing rings, fluid contaminants and the wear of sealing O-rings, occasional touching of the seal faces during rotation occurs. As an immediate consequence an abrasion associated with a heat buildup is a common cause of the seal damage.

Disorder in the delicate adjustment of the seal components may also cause uncontrolled vibrations with damaging effects.

Sensitivity to contaminants, requirement for the precision of components and flawless functioning of sealing rings are the main disadvantages of the described seals. In addition to the lack of robustness the seals exhibit undefined behaviour at very low rotational speeds and the rotation reversals.

It is therefore an object of the present invention to provide a robust, contact free seal that obviates or mitigates the above disadvantages.

In one aspect of the invention there is provided an improvement in a rotating machine having opposed spaced rotating and stationary sealing means, the rotating sealing means being attached to a rotating shaft and the stationary sealing means being fixed in relation to the housing of the machine, the rotating and stationary sealing means being separated by a fluid, the improvement comprising:

first sensing means for sensing the separation of the rotating sealing means from the stationary sealing means and for providing a sealing gap clearance signal indicative of the separation; and first controlling and actuation means responsive to the sealing gap clearance signal for automatically and continuously controlling the separation of the rotating and stationary sealing means.

The improvement may comprise:

second sensing means for detecting contact of the rotating sealing means with the stationary sealing means and providing a contact signal indicative of contact; and relay means for relaying the contact signal to the first actuation means for automatically separating the rotating sealing means from the stationary sealing means upon the detection of the contact between them.

The improvement may further include the actuation means being pneumatically operated and being normally pressurized to maintain a constant separation of the rotating and stationary sealing means and the relay means including a solenoid responsive to the contact signal to relieve the pressure from the actuation means.

In several embodiments of the second sensing means, it could be a friction switch, an electrode contact switch or an hydraulic pressure sensor.

Preferably, the first controlling and actuating means includes a controller disposed to receive sealing gap clearance signals from the sensing means and at least one actuator responsive to the controller, and the controller is set to actuate the actuator only when the sealing gap clearance signals indicate a separation that deviates from a predetermined position.

There is preferably a plurality of sensing means (including the first sensing means) for sensing the separation of the rotating sealing means from the stationary sealing means and for providing respective sealing gap clearance signals indicative of the separation; and a plurality of controlling and actuation means responsive to the respective sealing gap clearance signals for automatically and continuously controlling the separation of the rotating and stationary sealing means. Each of these plurality of sensing means and the plurality of controlling and actuation means is distributed evenly around the stationary sealing means.

In another aspect, the invention provides a mechanism for maintaining a suitable spacing between the rotating and stationary components of a seal for fluid substances in a rotating machine having a shaft and a housing, the mechanism comprising:

rotating and stationary sealing means for providing spaced interfacing bodies between the rotating shaft and the housing;

sealing gap measuring means for providing a sealing gap clearance signal indicative of the spacing between the rotating and stationary sealing means;

controlling means responsive to the sealing gap clearance signal for maintaining a suitable spacing between the rotating and stationary sealing means; and means responsive to the controlling means for moving the stationary sealing means in relation to the rotating sealing means.

In another aspect, the mechanism includes a sealing surface touch detecting means for perceiving and providing an alarm signal indicative of physical contact between the rotating and stationary sealing means and surface contact preventing means responsive to the alarm signal for separating the rotating sealing means from the stationary sealing means.

In a still another aspect, the invention includes the rotating sealing means being a ring shaped body having a first outer edge and further includes a ring member attached to the shaft adjacent the rotating sealing means, the ring member having a second outer edge; and a flexible membrane secured between the first outer edge of the rotating sealing means and the second outer edge of the ring member.

In a still further aspect, the stationary sealing means includes a circular stationary sealing ring fitted closely onto a stationary holding ring.

In a still further aspect, the stationary sealing ring is capable of an angular displacement in respect to the position of the stationary holding ring, and may include resilient means for holding the stationary sealing ring in a preset position in relation to the holding ring.

The sealing gap measuring means may include fluid jetting means in fluid connection with a fixed flow restricting means for establishing a hydrodynamic pressure commensurate with the spacing between the rotating and stationary sealing means.

The invention also provides a method of sealing a rotating machine having opposed spaced rotating and stationary sealing means, the rotating sealing means being attached to a rotating shaft and the stationary sealing means being fixed in relation to the housing of the machine, the rotating and stationary sealing means being separated by a fluid, the method comprising:

sensing the separation of the rotating sealing means from the stationary sealing means;

providing a sealing gap clearance signal indicative of the separation; and automatically and continuously controlling the separation of the rotating and stationary sealing means using first controlling and actuation means responsive to the sealing gap clearance signal.

The method may also include detecting contact of the rotating sealing means with the stationary sealing means and providing a contact signal indicative of contact; and relaying the contact signal to the first controlling and actuation means for automatically separating the rotating sealing means from the stationary sealing means upon the detection of the contact between them.

The method may also include adjusting the separation of the rotating and stationary sealing means only when the sealing gap clearance signals indicate a separation that exceeds a predetermined range.

BRIEF DESCRIPTION OF THE DRAWINGS

Embodiments of the present invention will be now described by way of an example only with reference to the accompanying drawings in which like numerals denote like elements and in which.

DETAILED DESCRIPTION OF PREFERRED EMBODIMENTS

Figure 1:
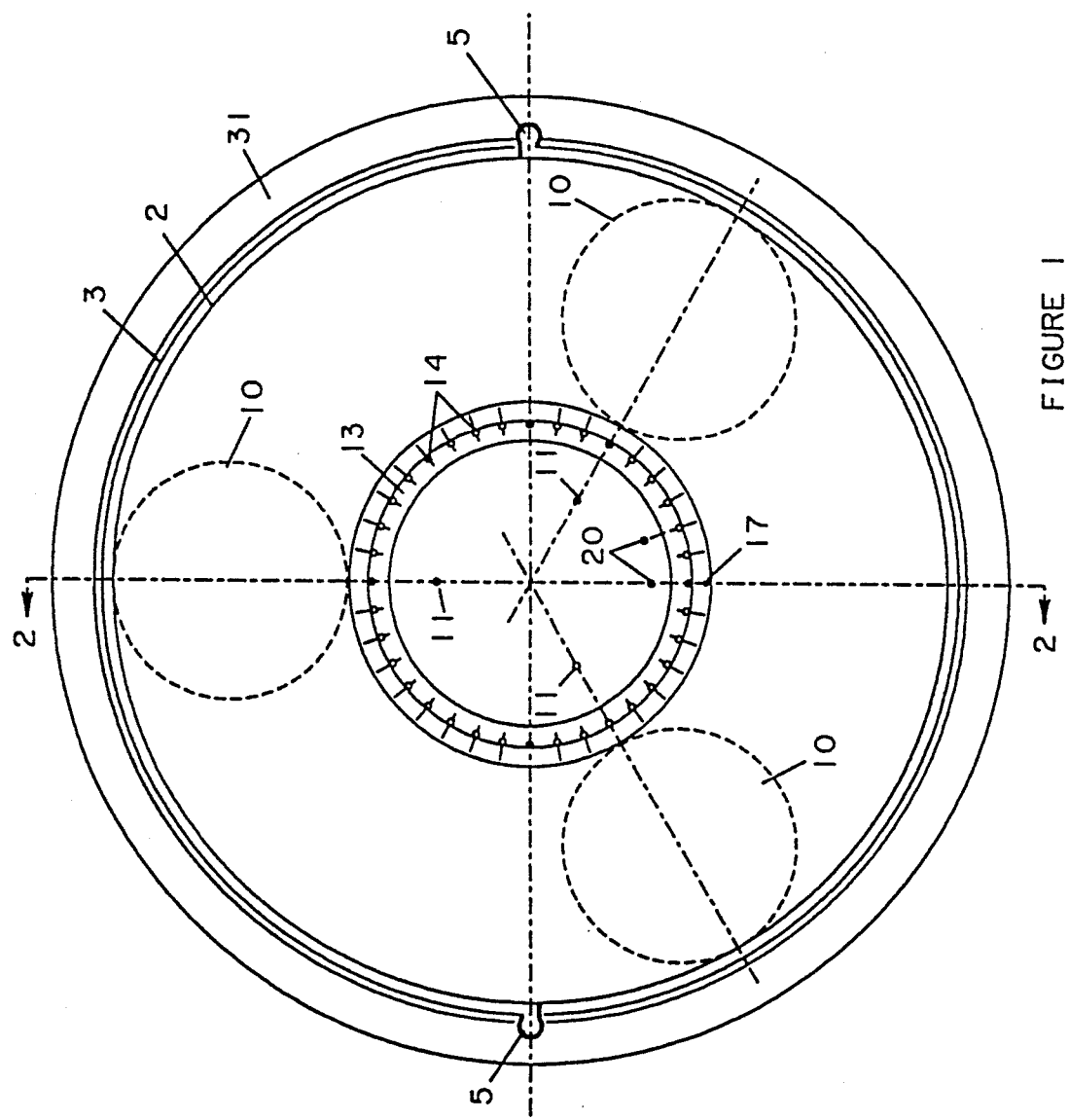
FIG. 1 shows a view of the stationary interfacing mechanism from the sealing face side, indicating the positions of various sensors and the actuators.
Figure 2:
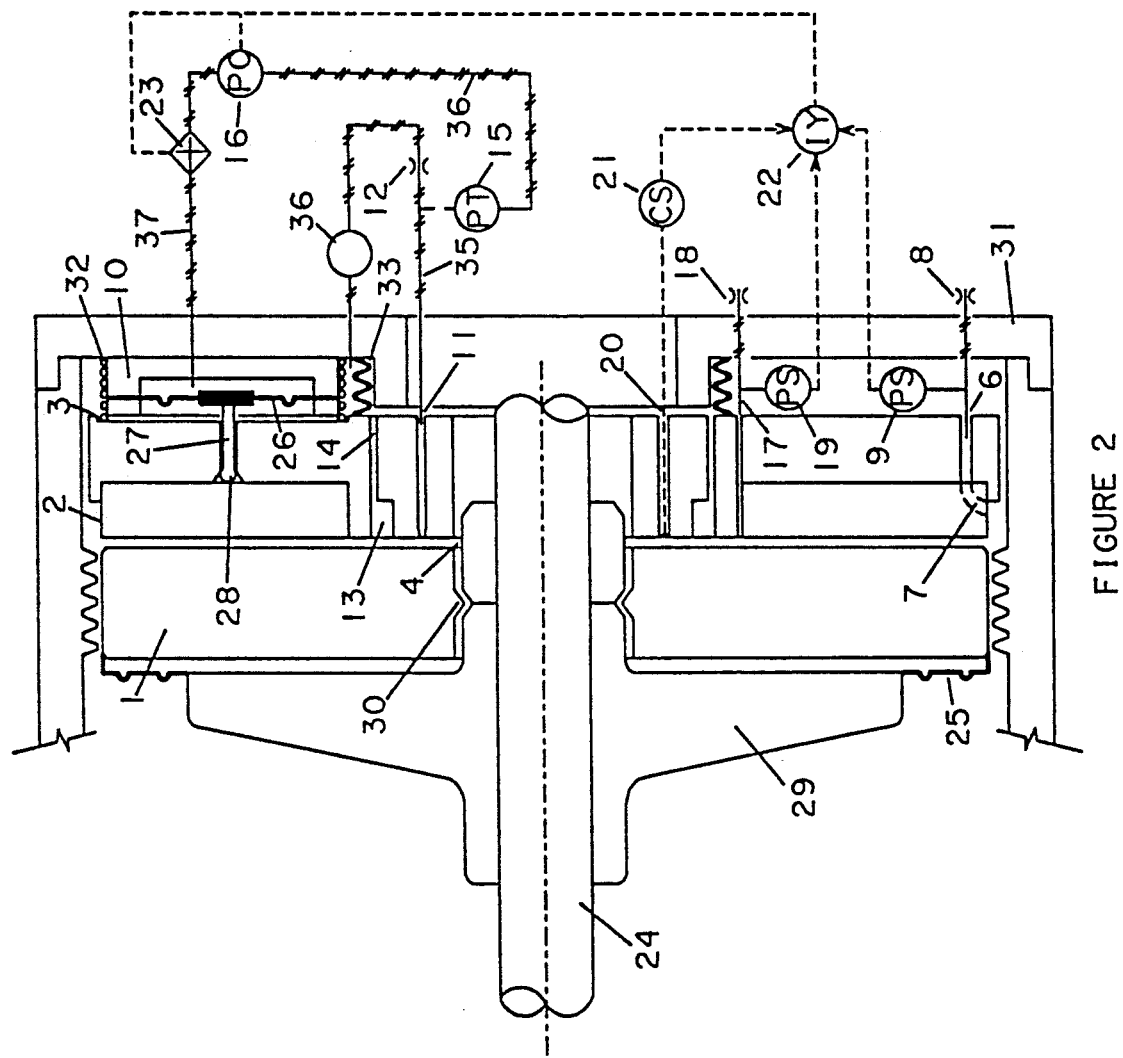
FIG. 2 shows a cross section along the line 2—2 of the embodiment shown in FIG. 1.

Sensors and controls implemented with pneumatic instruments are for the sake of simplicity shown in the symbolic form of control schematic diagrams for one controlled sector only. Similar schematics apply for each controlled sector. Three sectors are shown in FIG. 1, and it will be understood that while a preferred arrangement of three sectors, evenly distributed around the seal end of the rotating machine are shown, others could be provided as desired.

Referring to the figures, the major sealing components are the rotating ring or sealing means 1 and the stationary sealing means comprised of seal 2 and stationary holding ring 3. The rotating sealing means 1 is formed as a sealing ring with a smooth ground sealing surface onto which concentric grooves are machined. The rotating sealing means 1 is affixed flexibly to the rotating shaft 24, in part by diaphragm or flexible membrane 25, which is secured between the outer edge of the rotating sealing means and to the outer edge of a ring member 29 secured to the shaft 24. The rotating sealing means 1 pivots on its inner edge or diameter around an inner ridge 30 which rests in a counterpart groove or recess circumferentially disposed about the rotating shaft. Bellows 33 disposed between the stationary sealing means and the housing 31 seal fluid from escaping past the actuators 10 from the working space, the working space being defined as the pressurized area with which the fluid in the fluid seal is in hydraulic connection. The boundaries of the working space are defined by the rotating sealing means 1, the diaphragm 25, the stationary sealing means, the housing 31, the rotating shaft 24, the ring member 29 and the bellows 33. A small amount of fluid will escape between the rotating and stationary sealing means but this is not critical to the operation of the invention.

The stationary sealing means consists of a stationary holding ring 3 onto which a stationary sealing ring or sealing means 2 is closely fitted. The sealing surface of the stationary sealing means is ground flat with concentric venting grooves machined into it. The stationary sealing ring 2 and the holding ring 3 may be held together by the field of magnetized parts or by the help of springs (not shown). Fluid fills the gap between the rotating and stationary sealing means. The sealing ring 2 and holding ring 3 are separated to allow a relative angular displacement of the sealing ring 2 against the fixed position of the stationary holding ring 3. The relative displacement between components 2 and 3 is under normal operating conditions maintained at a predetermined position by the tension of springs or resilient means 5. The springs 5 are shown schematically, and in practice would not extend as far out as shown so that they may be accommodated within the housing 31.

A nozzle 11 forms fluid jetting means and is built into the holding ring of the stationary sealing means. The nozzle 11 is hydraulically connected to flow restriction means 12 via line 35 which terminates in a fluid filled cavity hydraulically separated from the fluid separating the rotating and stationary sealing means. The line from the flow restriction means to the fluid filled cavity includes a pressure regulator 36. The jet of the nozzle 11 is aligned to be flush with the sealing surface of the stationary sealing ring 2 and is pointed towards the sealing surface of the rotating ring 1. In order to separate the fluid pressure in the sealing gap 4 from the nozzle 11 a venting groove 13 with venting holes 14 (see particularly FIG. 1) is machined into the holding ring 3. Proximity of the respective sealing surfaces of the rotating ring 1 and the stationary ring 2 establishes a corresponding pressure of the fluid inside the nozzle.

The modulated pressure in the nozzle 11, indicative of variation of the sealing gap (the separation between the opposed surfaces of the rotating seal and the stationary seal 2) during rotation of the machine can be measured with a hydraulic transducer 15 on line 36. The transducer 15 may also be pneumatic, electromechanical or electronic.

The nozzle 11, restriction 12 and pressure transducer 15 together constitute means for sensing the separation of the rotating sealing means from the stationary sealing means. As the gap 4 varies, the transducer provides a sealing gap clearance signal indicative of the size of the gap or separation 4.

The measured pressure signal output or sealing gap clearance signal from the transducer 15 is used as the input of a controller 16 also on line 36. Controller 16 may also be any of various commercially available pressure controllers and is selected to maintain a constant value with an output signal supplied to an actuator 10, which may be of any of various designs but is preferably a pneumatic actuator as shown here. The pressure controller 16 and actuator 10 together constitute means responsive to the sealing gap clearance signal for automatically and continuously controlling the separation of the rotating and stationary sealing means. The actuator 10, in the example shown, includes a diaphragm 26 having an actuating rod 27 which terminates in an expanded end 28 held in a recess machined in the surface of the holding ring 3. Constant pressurization of the actuator 10 with fluid pressure from the controller 16 on line 37 maintains the separation of the rotating and stationary sealing means. A change in separation beyond a preset amount signals the pressure controller to change the pressure in the actuator 10 and thereby control the spacing 4. The controller may be preset to a specified spacing.

Both the control function and the feedback of this loop provide a positive and stable operation of the seal mechanism.

Protection of the sealing faces against a mutual contact is accomplished by a switch such as friction switch, a switch acting on the loss of pressure in the sealing gap or an electrical contact between the sealing face and electrodes. Actuation of the switch initiates a displacement of the actuator 10 which results in an increased gap between the sealing faces. The switch forms a second sensing means for detecting contact of the rotating sealing means with the stationary sealing means and providing a contact signal indicative of contact.

The friction switch is composed of slot 7 in stationary ring 2, nozzle 6, fluid flow restriction 8, pressure switch 9, and relay 22. The friction switch utilizes the friction forces between the rubbing faces of the rotating and stationary sealing rings. Touching of the sealing rings 1 and 2 causes an angular displacement of the stationary sealing ring 2 which actuates switch 9 hence relay 22.

The switch is actuated by the loss of pressure within the sealing gap and sends a signal indicative of the closure of the gap. A venting tube from the sealing face of the stationary ring is provided with a fixed flow restriction 8 which maintains a pressure in the tube while the sealing gap is open.

The pressure drop sensor switch is composed of tube 17, fixed flow restriction 18 and pressure switch 19. The electric switch is composed of electrode 20, and current sensor 21.

Any of the switches signals the relay 22 to send a corrective signal to all actuators (through the valve 23) and causes the opening of the sealing gap. The relay 22 may be connected to the pressure controller 16 to signal it to decrease the pressure in the line to the actuator 10, or it may be connected to the valve 23 to open the line, whereupon, with the line to the actuator being normally pressurized, the actuator will draw the stationary sealing ring away from the rotating sealing ring under pressure from the spring 32. The relay and accompanying lines thus relays the contact signal to the actuation means to automatically separate the rotating sealing means from the stationary sealing means upon the detection of the contact between them.

Referring in more detail to the drawing, the operation of the sealing system is as follows. The nozzle 11, restriction means 12 and transducer 15 react in response to sensing a change in the gap 4 to provide a pressure or sealing gap clearance signal that is indicative of the separation between the rotating and stationary sealing means. The pressure controller 16 and actuator 10 then react in response to the sealing gap clearance signal to automatically and continuously control the separation of the rotating and stationary sealing means.

More particularly, the sealing gap 4 measurement is accomplished with the nozzle 11 which is fed with fluid substance through a fixed flow restriction 12. Pressure of the feeding fluid to the restriction 12 is controlled by the pressure regulator 36. The opening of the gap 4 modulates the jetting fluid and results in a pressure in the nozzle 11 which is commensurate to the distance between the nozzle 11 and the sealing face of the rotating ring 1.

The modulated pressure in the nozzle 11 is amplified in the pressure transducer 15. Constant pressure and consequently the constant gap opening is maintained by the controller 16. Output of the controller 16 provides necessary power for the actuator 10 to perform the movement of the stationary components 2 and 3.

Protection against contact of the rotating and stationary sealing means is provided as follows. In general, the steps are detecting contact of the rotating sealing means with the stationary sealing means and providing a contact signal indicative of contact; and relaying the contact signal to the first actuation means for automatically separating the rotating sealing means from the stationary sealing means upon the detection of the contact between them.

More specifically, in a preferred embodiment, on mutual contact, the friction between seal faces of the rotating sealing ring 1 and the stationary sealing ring 2 produces a torque which counteracts the tension of springs 5 and causes the sealing ring 2 to move angularly. The angular motion of the ring 2 connects the nozzle 6 to the slot 7 which is machined into the back side of the stationary sealing ring 2. Opening of the passage through slot 7 and the nozzle 6 causes an immediate rise of pressure across the fixed restriction 8.

The pressure rise in the nozzle 6 actuates the switch 9 which itself signals the current relay 22, and forces the pneumatic actuators 10 of the seal to open the sealing gap 4 and annunciate an alarm condition (through an alarm system not shown). Valve 23 is a solenoid valve that is connected to the output of current relay 22 and, upon receiving a signal from the current relay, opens to actuate the actuator 10.

An additional protection against the gap 4 closure is achieved by sensing pressure in the tube 17 which vents the sealed substance from the gap through a fixed flow restriction 18. The gap closure causes a pressure drop in the tube 17 and actuates the switch . 19.

Closure of the sealing gap can also be detected with electrodes 20 which are built into the face of the stationary holding ring. Physical contact of the metal sealing faces closes an electrical circuit path through the electrodes and is sensed by a current sensor 21. Devices 9, 19 and 21 or any combination of those will on a true state activate the current relay 22. Relay 22 in turn actuates the solenoid valve 23 which controls the opening of the gap 4 with the help of actuators 10. The output signal from relay 22 may also change the setpoint of the controller 16 for the adjustment of the sealing gap 4, rather than use the solenoid valve 23. In that case, the pressure controller 16 will be adapted in conventional manner to respond to the output signal from relay 22 to change the pressure in the actuators 10 and thus the gap 4.

A person skilled in the art could make immaterial modifications to the invention described and claimed in this patent without departing from the essence of the invention.

I claim:

1. A method of sealing a rotating machine having opposed spaced rotating and stationary sealing means, the rotating sealing means being attached to a rotating shaft and the stationary sealing means being fixed in relation to the housing of the machine, the rotating and stationary sealing means being separated by a fluid, the method comprising:
   sensing the separation of the rotating sealing means from the stationary sealing means using a plurality of sensing means;
   providing a plurality of sealing gap clearance signals indicative of the separation;
   automatically and continuously controlling the separation of the rotating and stationary sealing means using a plurality of actuation means responsive to the sealing gap clearance signals;
   detecting contact of the rotating sealing means with the stationary sealing means and providing a contact signal indicative of contact; and
   relaying the contact signal to the first actuation means for automatically separating the rotating sealing means from the stationary sealing means upon the detection of the contact between them.

2. In a rotating machine having opposed spaced rotating and stationary sealing means, the rotating sealing means being attached to a rotating shaft and the stationary sealing means being fixed in relation to the housing of the machine, the rotating and stationary sealing means being separated by a fluid, the improvement conprising:
   first sensing means for sensing the separation of the rotating sealing means from the stationary sealing means and for providing a sealing gap clearance signal indicative of the separation;
   first controlling and actuation means responsive to the sealing gap clearance signal for automatically and continuously controlling the separation of the rotating and stationary sealing means;
   second sensing means for detecting contact of the rotating sealing means with the stationary sealing means and providing a contact signal indicative of contact; and
   relay means for relaying the contact signal to the first controlling and actuation means for automatically separating the rotating sealing means from the stationary sealing means upon the detection of the contact between them.

3. In the rotating machine of claim 2, the improvement further including the actuation means maintaining a constant separation of the rotating and stationary sealing means and the relay means responsive to the contact signal to increase the separation between the rotating and stationary sealing means with the actuation means.

4. In the rotating machine of claim 2, the improvement further including the second sensing means including a friction switch.

5. In the rotating means of claim 2, the improvement further including the second sensing means including an electrode contact switch.

6. In the rotating machine of claim 2, the improvement further comprising the second sensing means including a sealing fluid pressure sensor.

7. In the rotating machine of claim 2, the improvement further comprising:
   the sealing gap measuring means including fluid jetting means in fluid connection with a fixed flow restricting means for establishing a hydrodynamic pressure commensurate with the spacing between the rotating and stationary sealing means and means to separate fluid pressure of the fluid between the rotating and stationary sealing means from the fixed flow restriction means.

8. In a rotating machine having opposed spaced rotating and stationary sealing means, the rotating sealing means being attached to a rotating shaft and the stationary sealing means being fixed in relation to the housing of the machine, the rotating and stationary sealing means being separated by a fluid, the improvement comprising:
   first sensing means for sensing the separation of the rotating sealing means from the stationary sealing means and for providing a sealing gap clearance signal indicative of the separation;
   first controlling and actuation means responsive to the sealing gap clearance signal for automatically and continuously controlling the separation of the rotating and stationary sealing means;
   a plurality of sensing means for sensing the separation of the rotating sealing means from the stationary sealing means and for providing second sealing gap clearance signals indicative of the separation;
   a plurality of actuation means responsive, through the controlling means, to the second sealing gap clearance signals for automatically increasing the separation of the rotating and stationary sealing means; and
   the first and the plurality of sensing means and the first and the plurality of actuation means being distributed evenly around the stationary sealing means.

9. In the rotating machine of claim 8, the rotating sealing means having an outer edge, an inner edge, and an inner ridge circumferentially disposed around the inner edge, and the rotating shaft having a ring member affixed to the rotating shaft and including a circumferential recess disposed about the rotating shaft;
   the rotating sealing means being flexibly attached to the rotating shaft by a flexible membrane attached between the first outer edge and the ring member; and
   the inner ridge resting in the circumferential recess.

10. In the rotating machine of claim 9, the improvement further comprising bellows disposed between the housing and the stationary sealing means for containing the fluid within the chamber of the stationary sealing means.

11. A mechanism for maintaining a suitable spacing between the rotating and stationary components of a seal for fluid substances in a rotating machine having a shaft and a housing, the mechanism comprising:

rotating and stationary sealing means for providing spaced interfacing bodies between the rotating shaft and the housing;

at least three sealing gap measuring means distributed evenly about the seal for providing a plurality of sealing gap clearance signals indicative of the spacing between the rotating and stationary sealing means;

controlling means responsive to the plurality of sealing gap clearance signals for maintaining a suitable spacing between the rotating and stationary sealing means; and at least three actuation means distributed evenly about the seal and responsive to the controlling means for moving the stationary sealing means in relation to the rotating sealing means.

12. The mechanism of claim 11 further including a sealing surface touch detecting means for perceiving and providing an alarm signal indicative of physical contact between the rotating and stationary sealing means and surface contact preventing means responsive to the alarm signal for separating the rotating sealing means from the stationary sealing means.

13. The mechanism of claim 11 in which the rotating sealing means is a ring shaped body having a first outer edge and further including:

a ring member attached to the shaft adjacent the rotating sealing means, the ring member having a second outer edge; and a flexible membrane secured between the first outer edge of the rotating sealing means and the second outer edge of the ring member.

14. The mechanism of claim 12 in which the stationary sealing means includes a circular stationary sealing ring fitted closely onto a stationary holding ring.

15. The mechanism of claim 14 in which the stationary sealing ring is capable of an angular displacement in respect to the position of the stationary holding ring.

16. The mechanism of claim 15 further including resilient means for holding the stationary sealing ring in a preset position in relation to the holding ring.

17. The mechanism of claim 11 in which each sealing gap measuring means includes fluid jetting means in fluid connection with a fixed flow restricting means for establishing a hydrodynamic pressure commensurate with the spacing between the rotating and stationary sealing means.

18. The mechanism of claim 17 further including means to separate fluid pressure of the fluid between the rotating and stationary sealing means from the fixed flow restriction means.

19. The mechanism of claim 11 in which at least one of the actuation means is a pneumatic actuator.

* * * * *